United States Patent
Ahmavaara et al.

(10) Patent No.: US 6,792,278 B1
(45) Date of Patent: Sep. 14, 2004

(54) METHOD FOR ESTABLISHING A SIGNALING CONNECTION WITH A MOBILE STATION

(75) Inventors: Kalle Ahmavaara, Vantaa (FI); Jukka Vialen, Espoo (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/647,022

(22) PCT Filed: Apr. 1, 1999

(86) PCT No.: PCT/FI99/00276
§ 371 (c)(1),
(2), (4) Date: Nov. 7, 2000

(87) PCT Pub. No.: WO99/52317
PCT Pub. Date: Oct. 14, 1999

(30) Foreign Application Priority Data

Apr. 3, 1998 (FI) .................................................. 980783

(51) Int. Cl.[7] .............................................. H04Q 7/20
(52) U.S. Cl. ........................ 455/461; 455/458; 455/567; 455/432.1; 370/328; 370/329
(58) Field of Search ................................. 455/461, 458, 455/432.1, 433, 435.1, 445, 567, 551, 552.1; 370/310, 312, 230, 328–329

(56) References Cited

U.S. PATENT DOCUMENTS 5,003,629 A * 3/1991 Ness-Cohn et al. ......... 340/7.45
5,437,053 A * 7/1995 Sawa et al. .................. 455/551

(List continued on next page.)

FOREIGN PATENT DOCUMENTS

| EP | 0 782 352 A2 | 7/1997 |
|---|---|---|
| EP | 0 827 354 A2 | 3/1998 |
| GB | 2 293 946 A | 4/1996 |
| JP | 07 27 4255 | 10/1995 |
| WO | WO 92/19078 | 10/1992 |
| WO | WO 95/07009 | 3/1995 |
| WO | WO 95/14355 | 5/1995 |
| WO | WO 97/47095 | 12/1997 |
| WO | WO 98/30046 | 7/1998 |

OTHER PUBLICATIONS

Office Action dated Mar. 18, 2003 in corresponding to Japanese Patent Application No. 2000–542947.

* cited by examiner

Primary Examiner—William Trost
Assistant Examiner—Sharad Rampuria
(74) Attorney, Agent, or Firm—Cohen, Pontani, Lieberman & Pavane

(57) ABSTRACT

The invention comprises a method for establishing a signaling connection with a mobile station, which method is particularly applicable to third-generation mobile communications networks. A database is created at a node of a mobile communications network, and a mobile station connected with the network sends to said database information about all its subscriber identities (403). In the database, information is added (404) to the subscriber identity information which may be useful when said mobile station is paged (410, 411). Such contactability information includes e.g. the mobile station's location information, information about existing signaling connections and information about the primary paging channel monitored by the mobile station. The contactability information is updated according to changes detected in the status of the mobile station (406). The database will be discontinued for a mobile station that has had no connections for a predetermined time. The method reduces paging channel load in cells, reduces the need of mobile stations to listen to paging channels and makes radio access networks connections to multiple core networks more practical.

70 Claims, 5 Drawing Sheets

U.S. PATENT DOCUMENTS

| | | | | |
|---|---|---|---|---|
| 5,613,199 A | * | 3/1997 | Yahagi | 455/426.1 |
| 5,649,289 A | * | 7/1997 | Wang et al. | 340/7.22 |
| 5,745,850 A | * | 4/1998 | Aldermeshian et al. | 455/417 |
| 5,777,560 A | * | 7/1998 | Sakai et al. | 340/7.27 |
| 5,787,349 A | * | 7/1998 | Taketsugu | 455/445 |
| 5,819,176 A | * | 10/1998 | Rast | 455/422.1 |
| 5,924,042 A | * | 7/1999 | Sakamoto et al. | 455/458 |
| 5,943,620 A | * | 8/1999 | Boltz et al. | 455/445 |
| 5,946,626 A | * | 8/1999 | Foladare et al. | 455/456.1 |
| 5,960,345 A | * | 9/1999 | Laatu | 455/435.1 |
| 5,970,387 A | * | 10/1999 | Yuan | 340/7.28 |
| 6,044,069 A | * | 3/2000 | Wan | 370/311 |
| 6,044,086 A | * | 3/2000 | Albrow et al. | 370/458 |
| 6,047,194 A | * | 4/2000 | Andersson | 455/466 |
| 6,058,308 A | * | 5/2000 | Kallin et al. | 455/432.3 |
| 6,088,589 A | * | 7/2000 | Valentine et al. | 455/433 |
| 6,212,372 B1 | * | 4/2001 | Julin | 455/418 |
| 6,212,390 B1 | * | 4/2001 | Rune | 455/456.6 |
| 6,233,430 B1 | * | 5/2001 | Helferich | 340/7.21 |
| 6,349,209 B1 | * | 2/2002 | Foladare et al. | 455/445 |
| 6,381,454 B1 | * | 4/2002 | Tiedemann, Jr. et al. | 455/419 |
| 6,385,453 B1 | * | 5/2002 | Foladare et al. | 455/445 |
| 6,542,752 B1 | * | 4/2003 | Illidge | 455/458 |
| 6,618,587 B1 | * | 9/2003 | Ghafoor | 455/419 |

* cited by examiner

METHOD FOR ESTABLISHING A SIGNALING CONNECTION WITH A MOBILE STATION

CROSS REFERENCE TO RELATED APPLICATIONS

This is a U.S. national stage application under 35 U.S.C. §371 of international stage, application No. PCT/FI99/00276, filed on Jan. 4, 1999. Priority is claimed under 35 U.S.C. §119(a) and 35 U.S.C. §365(b) from Finnish Patent Application No. 980783, which was filed on Apr. 3, 1998, and from which priority was properly claimed in the aforementioned international stage application.

Figure 1:
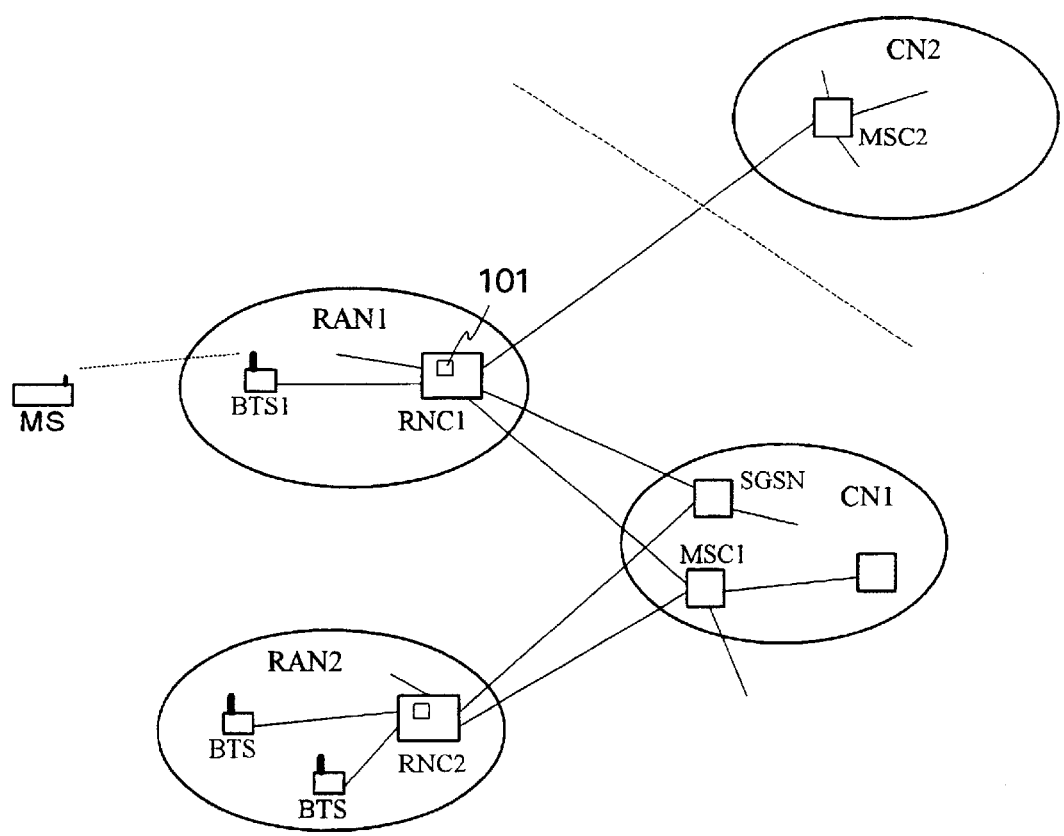

FIG. 1 illustrates the basic digital mobile communications system architecture. Typically, a mobile communications network comprises at least one core network CN and one or more radio access networks RAN. A core network CN comprises mobile switching centers MSC and possibly other service nodes. A "node" is here a generic name for network components that take part in the switching; thus it also covers mobile switching centers and other exchange equipment. The radio access networks are located between the core network and the terminal equipment. A radio access network comprises base transceiver stations BTS and a radio network controller RNC. Each base transceiver station BTS is connected in a fixed manner with the radio network controller RNC of the radio access network in question. Each radio network controller is in turn connected in a fixed manner with at least one core network node.

The general principle of paging in digital mobile communications networks is according to FIG. 2 as follows. When a call has arrived in a mobile switching center MSC in the traffic area in which the called subscriber is located at that moment, the switching center sends a paging request via radio network controllers to those base transceiver stations in whose area the register data indicate the called subscriber is. The base transceiver stations send the paging message to the radio path on their paging channels PCH. A mobile station that detects its own subscriber identity on a paging channel which it monitors, sends a response to the base transceiver station. This way the network will know the location of the called subscriber with an accuracy of one cell, and the data connection can be established. In this description and in the claims attached hereto, "data connection" refers to a connection established for the transmitted signal proper. Usually, the most common type of data connection is a voice connection.

In third-generation mobile communications networks, a mobile station may have several international mobile subscriber identities IMSI, and may also have multiple simultaneous data connections under different subscriber identities. If a mobile station has no data connection, an incoming call according tothe prior art always initiates the paging process described above. If the mobile station has a data connection via a given core network node under a subscriber identity, and another node receives a call associated with another subscriber identity of the mobile station, the normal paging process is initiated in this case, too. A disadvantage of this procedure is that, in principle, the network's signaling capacity is used unnecessarily since the location information of the mobile station in question is already in the network, and that the mobile station possibly has to listen to several paging channels. Arrangements according to the prior art do not support calls directed to one and the same mobile station from different core networks. Establishment of data connections from different core networks to a single mobile station is in principle possible, but it requires that the paging message coming from one of the core networks be distributed to all base transceiver stations and all paging channels, and that the called mobile station listen to all paging channels used in the cell in question. If the paging message is sent only on a given paging channel, it may happen that due to an existing connection the mobile station is unable to listen to the paging channel in question.

An object of the present invention is to minimize the aforementioned disadvantages associated with the prior art. The method according to the invention is characterized by what is expressed in the independent claim. Preferred embodiments of the invention are described in the dependent claims.

The basic idea of the invention is as follows. In a suitable network node, such as the radio network controller RNC of each radio access network, a paging database is created in order to reduce signaling needed for the establishment of data connections. Data useful in connecting the called mobile station are collected in the paging database. For example, when a data connection has been established to a mobile station under a given subscriber identity, the mobile station informs the network in an agreed manner about all the subscriber identities in its use e.g. during call set-up or later during the connection or using e.g. a separate message independent of the possible connections. The network stores these identities in the paging database together with the mobile station location information and signaling connection data possibly associated with said data connection. If, during said connection, the mobile station moves into another cell, the data relating to the mobile station are updated in the paging database. If, during said or a subsequent connection, another subscriber identity of the same mobile station is paged at any node, the network checks the paging database and uses the data found therein to establish a signaling connection.

Advantageously, when the mobile station's data connection(s) is/are terminated, the data associated with the mobile station are kept in the paging database for at least a certain predetermined period of time after the termination of the connection(s).

An advantage of the invention is that the paging channel load in the cells is reduced since no paging process is needed for the incoming calls, at least not if a data connection already exists at the mobile station. From the mobile station's point of view this means that during a data connection it does not have to listen to the paging channels. Another advantage of the invention is that when a mobile station is called that has no data connections but has information about it in the database according to the invention, it possibly suffices to send the paging message to one paging channel only. From the point of view of the mobile station this means that it only needs to listen to one paging channel. Yet another advantage of the invention is that connections from different core networks to one and the same radio access network will become practical. This is due to the fact that if a subscriber identity associated with a call coming from an "outside" core network is found in the database according to the invention, the information associated with the identity can be used to direct the paging. For such calls, a mobile station only needs to listen to one paging channel, and not even that in the best case. A further advantage of the invention is that when the general packet radio service GPRS is used, there is no need to transfer subscriber identity information between the mobile switching center MSC and the serving GPRS support node SGSN. A yet further advantage of the invention is that the setting up of simultaneous connections of a mobile station becomes quicker.

Figure 3:
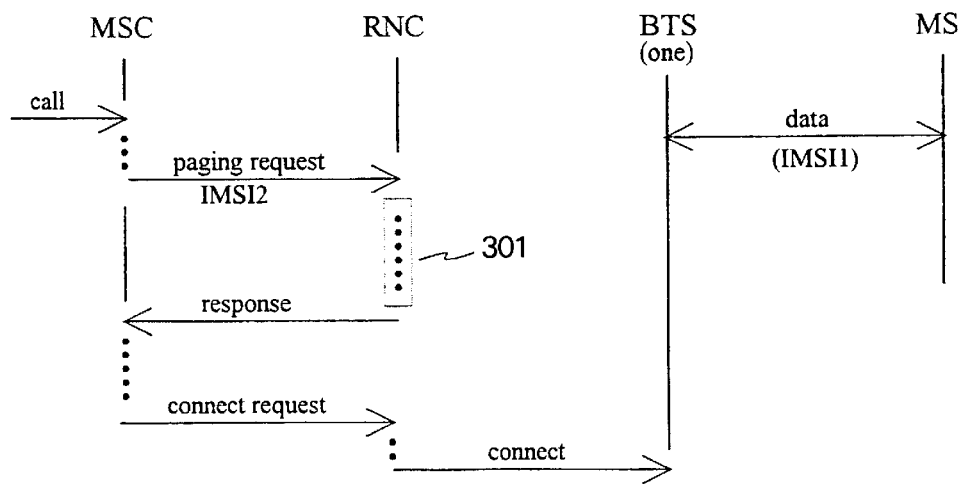
Figure 4:
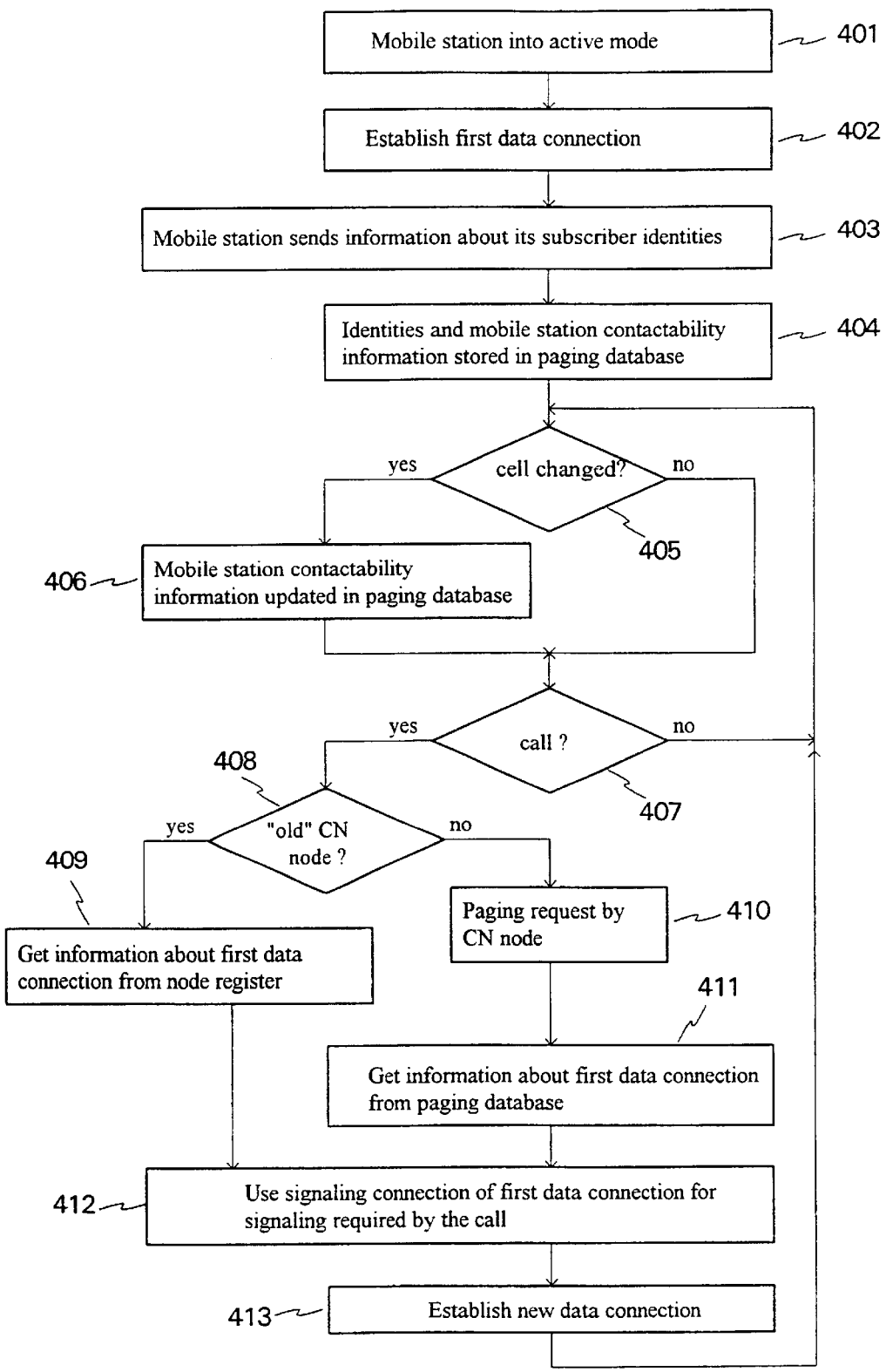
Figure 5:
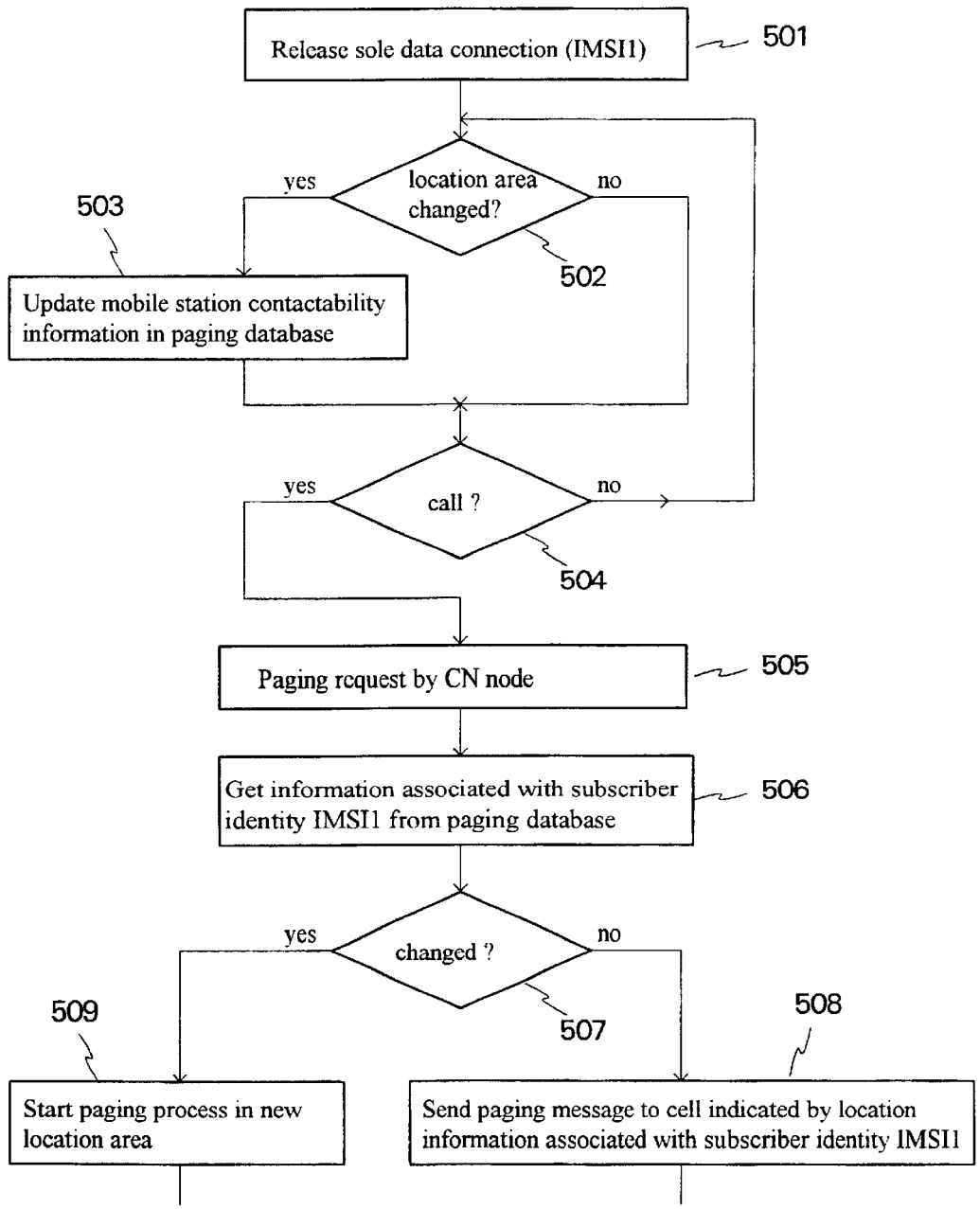
Figure 6:
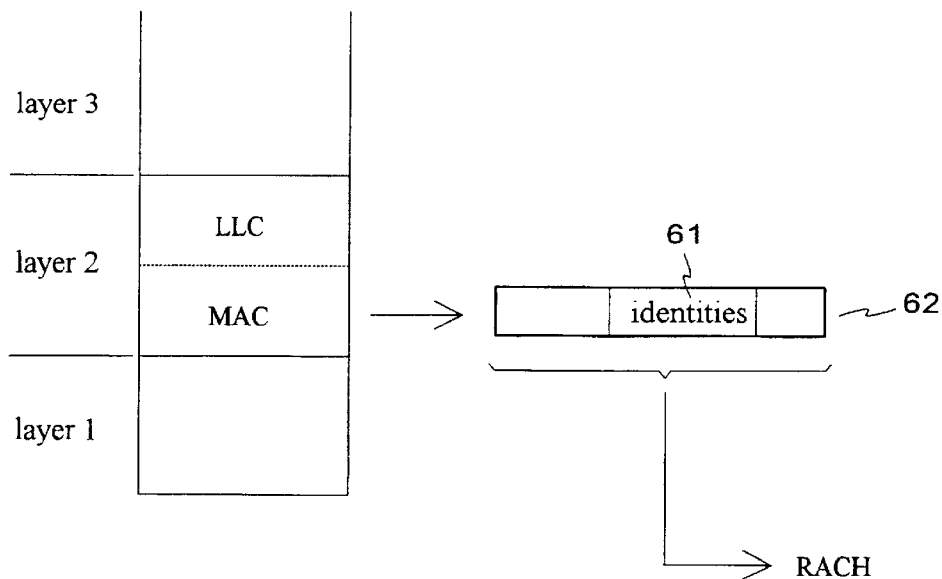
Figure 7:
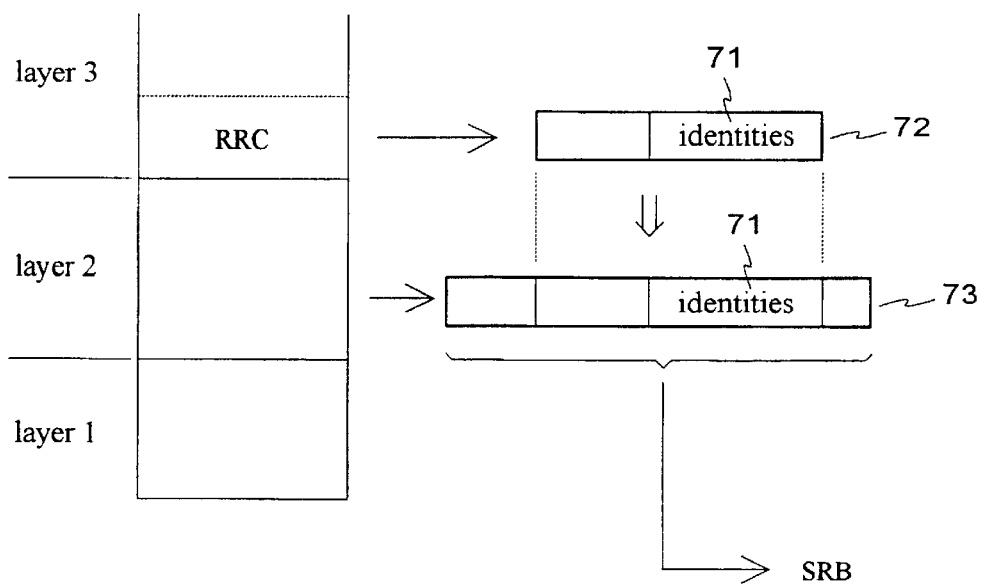

The invention is below described in detail. Reference is made to the accompanying drawing in which FIG. 1 shows an example of a network architecture in which the invention is applicable, FIG. 2 illustrates signaling in the paging according to the prior art, FIG. 3 shows an example of signaling according to a preferred embodiment of the invention, FIG. 4 shows by way of example a block diagram illustrating the operation according to a preferred embodiment of the invention, FIG. 5 shows in the form of block diagram a second example of the operation according to a preferred embodiment of the invention, FIG. 6 shows an example of the transfer of subscriber identity information according to a preferred embodiment of the invention, and FIG. 7 shows a second example of the transfer of subscriber identity information according to a preferred embodiment of the invention.

Like elements in the drawing are denoted by like reference designators.

FIG. 1 was already discussed regarding the basic network architecture. FIG. 1 shows two core networks CN1 and CN2 which may belong to mobile communications networks of different operators. In this example, core network CN1 comprises at least one mobile switching center MSC1 and one serving GPRS support node SGSN. Radio access networks RAN1 and RAN2, for example, are found in the traffic area of the switching center MSC1 in core network CN1. Controller RNC1 of radio access network RAN1 and controller RNC2 of radio access network RAN2 are connected in a fixed manner to both switching center MSC1 and node SGSN. Terminals in the network are connected via the radio path to base transceiver stations. In FIG. 1, a mobile station MS is in the traffic area, or cell, of base transceiver station BTS1 of radio access network RAN1, and is connected to the base transceiver station BTS1.

In FIG. 1 there is, unlike in the usual arrangement, a connection from controller RNC1 of radio access network RAN1 to a switching center MSC2 of another core network CN2. Such a connection may be provided e.g. if the operator of core network CN2 wants to lease traffic capacity from radio access network RAN1. Furthermore, radio network controller RNC1 of FIG. 1 has a paging database 101 according to the invention to enhance traffic control. For simplicity, FIG. 1 shows no additional hardware or software components of radio access networks RAN1 and RAN2 of core networks CN1 and CN2.

Figure 2:
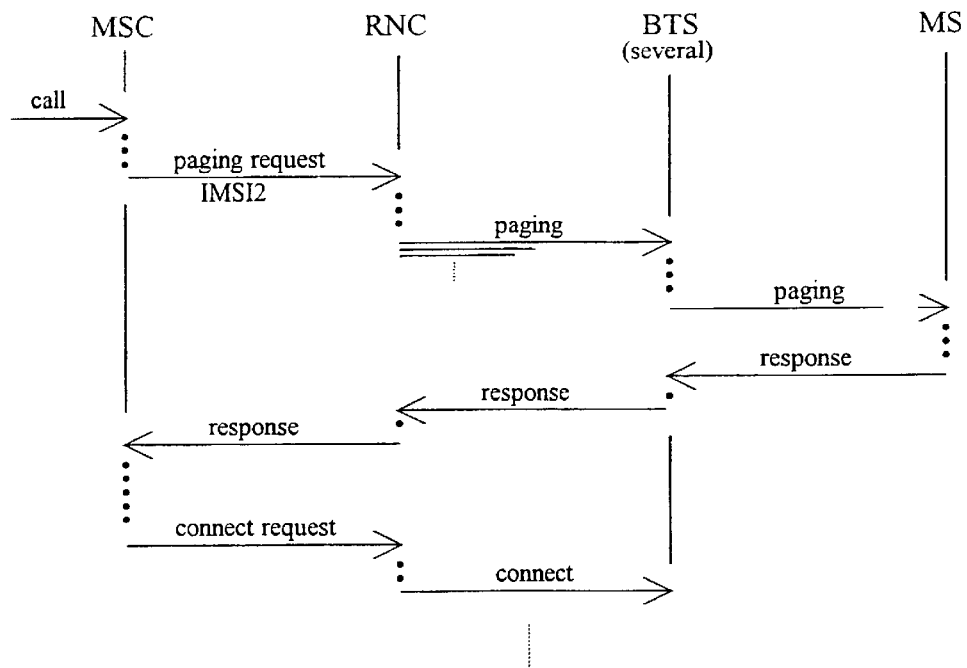

FIG. 2 was already briefly discussed above. It shows in the form of timing diagram an example of paging signaling according to the prior art. Participating in the signaling are a mobile switching center MSC, at least one radio network controller RNC, a plurality of base transceiver stations BTS and a mobile station MS. At first, a CALL arrives in the mobile switching center MSC. On the basis of information in the call and in a register in connection with the switching center the switching center associates the call with the subscriber identity IMSI2 used by the mobile station MS. The mobile station MS may simultaneously have a data connection established earlier under a subscriber identity. The switching center sends a PAGING REQUEST, including the subscriber identity IMSI2, to the controllers RNC of the radio access network or networks in the area of which the register data indicate the mobile station MS is located. On the basis of the paging request each controller RNC sends a PAGING message to the base transceiver stations BTS of its area, and each base transceiver station sends a paging message to the radio path on at least one paging channel PCH. Each active mobile station listens to at least one paging channel. Said mobile station MS detects in the paging message its own subscriber identity IMSI2 and sends a RESPONSE message to a base transceiver station in the cell in which it is located. This, in turn, sends a response message to the respective radio network controller RNC which then sends a response message to the switching center MSC. The response message includes information indicative of the cell in which the mobile station MS is located, on the basis of which the MSC sends to the appropriate radio network controller RNC a CONNECT REQUEST for a new data connection. Said controller sends to the appropriate base transceiver station BTS the necessary instructions in a CONNECT message. FIG. 2 does not show the steps associated with the setting up of the data connection proper.

FIG. 3 shows in the form of timing diagram an example, corresponding to the one shown in FIG. 2, of the operation according to a preferred embodiment of the invention. The initial stages of the operation from the call up to the moment when the paging request is sent to at least one radio network controller RNC are identical with the example of FIG. 2. In this example, the database 101 according to the invention is established in at least one radio network controller RNC. Moreover, in this example, the mobile station MS to which the CALL is targeted at has at the moment of the call a data connection under subscriber identity IMSI1. Because of this earlier connection the database 101 contains information about the location of the mobile station with the accuracy of one cell. As the controller RNC receives a paging request for IMSI2, it checks 301 the paging database 101. As a result of that check, if finds information about the location of the mobile station identified as IMSI2. Therefore, the controller RNC immediately sends a RESPONSE message to the switching center MSC. The paging process proper may thus be skipped. When the switching center has received the response message, the operation continues as in the example of FIG. 2.

FIG. 4 shows in the form of block diagram an example according to a preferred embodiment of the invention of the use of the paging database 101 in the network of FIG. 1. In block 401, power is switched on at a mobile station MS, which has been assigned at least a first subscriber identity IMSI1 and a second subscriber identity IMSI2, whereby the mobile station enters the active mode. In block 402 a call is made from or to the mobile station MS, whereby a first data connection is established under identity IMSI1 via base transceiver station BTS1, controller RNC1 and switching center MSC1 to another terminal. In block 403 the mobile station MS sends in a fixed-form message all its subscriber identities to a certain signaling channel. In block 404 the radio network controller RNC1 receives said message and the software stores the subscriber identities listed in the message in the paging database 101. At the same time, contactability information for the mobile station MS, which information is known on the basis of the first data connection, is stored in the database 101. In block 405 it is determined the base transceiver station which has the strongest field at the mobile station MS. In case of a handover, the mobile station's contactability information is updated in the database 101, as indicated in block 406. Contactability information refers here and in the claims to data which are useful for the establishment of a signaling connection for the mobile station. Said data may comprise e.g. information about the cell in which the mobile station is located, information about the signaling connections of the mobile station's existing data connections, and information about the primary paging channel monitored by the mobile station.

In block 407 it is checked whether a call for the mobile station MS has arrived in any of the core network nodes. In block 408 possible calls are divided into two groups: If a call associated with the second subscriber identity IMSI2 has arrived in an "old" node, in this case the switching center MSC1, said switching center can see from the register information that the mobile station corresponding to identity IMSI2 has an existing data connection under identity IMSI1. In block 409 the switching center software finds in the register the information on identity IMSI1. The switching center MSC1 then instructs controller RNC1 to set up a data connection to the same mobile station as with identity IMSI1, but now under identity IMSI2. As shown in block 412, signaling uses the same signaling connection that was used for the first data connection. So, in the branch represented by block 409, a new data connection can be established (block 413) without a new paging but also without the operation according to the invention.

If a call for mobile station MS has arrived in a node other than MSC1, e.g. in node SGSN or switching center MSC2, the node in question sends a paging request for mobile station MS to radio network controller RNC1, as shown in block 410. In block 411 the software in controller RNC1 retrieves the location information corresponding to the second subscriber identity IMSI2 from the paging database 101. On the basis of said information controller RNC1 immediately knows the right base transceiver station to signal with, so that the new connection can be established without the paging process. In addition, information about the signaling connection associated with the first data connection is also fetched from the database 101, which information is then used in setting up the new data connection (block 412). After that, the fast paging described above may be repeated even if the first data connection were released, as long as there exists a connection.

FIG. 5 shows in the form of block diagram a second example of the use of a paging database 101 according to a preferred embodiment of the invention in the network of FIG. 1. The example illustrates the paging of a mobile station MS the data connections of which have terminated but which is still in active mode. In block 501, the last data connection, under subscriber identity IMSI1, is released. After that, the mobile station is in standby mode. Here and in the claims, the standby mode of a mobile station refers to the mode in which the mobile station is in after the termination of a data connection or data connections and in which the mobile station is ready to receive new calls. During the standby mode the network monitors the location of the mobile station (block 502) with an accuracy of a location area LA, which comprises a plurality of cells. If necessary, contactability information of the mobile station MS is updated in the paging database 101, as shown in block 503. In block 504 it is checked whether a call for the mobile station has arrived in a core network node. If no call arrives in a predetermined time and no connection is initiated by the mobile station, the paging database will be discontinued for the mobile station in question. This time-out monitoring is not shown in FIG. 5. If a new call arrives, the core network node in question sends in the normal manner a paging request to radio network controller RNC1, as shown in block 505. The call may be associated with any subscriber identity used by the mobile station MS. In block 506, the software in controller RNC1 retrieves the information relating to identity IMSI1 from the paging database. In block 507 it is checked whether the location information has changed after the release of the last data connection. If it is found that the mobile station MS is located in a location area LA different than the one where it was when the previous data connection was terminated, a paging process is started in the area in question (block 509). If it is found that the mobile station MS is in the same location area as where it was when the previous data connection was terminated, a paging message is sent to the cell indicated by the location information associated with identity IMSI1 (block 508). This is done because the mobile station MS is then probably in the same cell as where it was when the previous data connection was terminated. If, however, it does not respond, a more extensive paging process has to be initiated. This is not depicted in FIG. 5, nor is the establishment of a new data connection with the signaling associated with it.

FIG. 6 shows an example of sending subscriber identity information in accordance with a preferred embodiment of the invention. The identity information 61 is placed in a random access message 62 generated in the medium access control (MAC) portion of the data link layer (layer 2) and are sent on a random access channel (RACH).

FIG. 7 shows an example of sending subscriber identity information in accordance with a second preferred embodiment of the invention. The identity information 71 is placed in a special message 72 generated in the radio resources control (RRC) portion of the network layer (layer 3). The data link layer (layer 2) adds to the message 72 its own control parts. The resulting message 73 is sent on a signal radio bearer (SRB) channel intended for RRC-layer messages.

The names of signals, channels, systems and system components as well as the names of other objects used in the examples above are in accordance with the plans for a so-called third-generation mobile communications system, which is discussed here only by way of example, so as to provide an example of a possible application of the invention. The application of the invention is not limited to any particular mobile communications system.

Above it was described functions according to the invention. The invention is not limited to the solutions described above. For example, the paging database may be established at a core network node. The size of the paging database may be limited not only by setting a limit for the time that the data about the mobile stations in standby mode are kept, but also e.g. by specifying, by means of special criteria, the mobile stations the data of which are kept. The subscriber identity information may also be sent e.g. in the paging response message or in a message indicating the mobile station's parameter values. The inventional idea may be modified in various ways within the scope defined by the claims attached hereto.

What is claimed is:

1. A method for establishing a signaling connection with an active mobile station assigned at least two subscriber identities, wherein the method comprises the steps of:

creating a paging database of mobile stations with active connections in a radio access network (RAN) of a radio network controller (RNC) that includes said paging database, wherein said paging database comprises subscriber identities and contactability information for the corresponding active mobile stations, wherein said at least two subscriber identities of said mobile station comprise a first subscriber identity under which said mobile station has a present active connection in said RAN; and if a new signaling connection under a second subscriber identity is to be established with said mobile station, the RNC uses said subscriber identity and contactability information in said paging database to establish the new signaling connection under the second subscriber identity by only signaling a base transceiver station (BTS) having the present active connection under the first subscriber identity with said mobile station.

2. The method of claim 1, wherein the paging database is located in a core network (CN).

3. The method of claim 1, wherein said contactability information comprises location information concerning said active mobile stations.

4. The method of claim 1, wherein said contactability information comprises information about signaling connections associated with data connections of said active mobile stations.

5. The method of claim 1, wherein said contactability information comprises information about primary paging channels monitored by said active mobile stations.

6. The method of claim 1, wherein a call for said mobile station, associated with said second subscriber identity, arrives in a node of a core network connected with said RAN, and wherein the signaling required by said received call uses the same signaling connection as is being used in the signaling of the present active connection.

7. The method of claim 5, wherein said mobile station has a main subscriber identity ($IMSI_m$) which is stored in the paging database, further comprising the steps of:
ceasing said present active connection under said first subscriber identity, thereby putting said mobile station in standby model;
receiving a call for said mobile station in a node of a core network connected with said RAN; and
sending a paging message corresponding to said call to a paging channel according to the paging database contactability information associated with the main subscriber identity $IMSI_m$.

8. The method of claim 3, further comprising the steps of:
ceasing said present active connection under said first subscriber identity, thereby putting said mobile station in standby mode;
receiving a call for said mobile station, associated with said second subscriber identity, in a node of a core network connected with said RAN; and
sending a paging message corresponding to said call from the RNC of said RAN to a cell corresponding to the location information in the paging database contactability information associated with said first subscriber identity.

9. The method of claim 1, further comprising the step of:
sending, by said mobile station, to the RNC information about all subscriber identities used by it in order for the RNC to collect said subscriber identity information in the paging database.

10. The method of claim 9, wherein the sending step comprises the step of:
sending said subscriber identity information in a MAC-layer message on a channel intended for MAC-layer messages.

11. The method of claim 10, wherein said signaling channel intended for MAC-layer messages is the RACH.

12. The method of claim 9, wherein the sending step comprises the step of:
sending said subscriber identity information in an RRC-layer message on a channel intended for RRC-layer messages.

13. The method of claim 12, wherein said signaling channel intended for RRC-layer messages belongs to the SRB channels.

14. The method of claim 12, wherein said RRC-layer message is a message defined specifically for the transfer of subscriber identity information.

15. The method of claim 12, further comprising the steps of:
receiving, by said mobile station during the establishment of a data connection, a paging message; and
sending, by said mobile station, a response message for the paging message, wherein said subscriber identity information is included in said response message for the paging message.

16. The method of claim 12, wherein said subscriber identity information is included in a message indicating parameter values for the mobile station.

17. The method of claim 1, further comprising the step of:
updating the contactability information associated with said mobile station when said mobile station moves from one cell to another.

18. The method of claim 1, wherein said present active connection under said first subscriber identity has ceased, thereby putting said mobile station in standby mode, further comprising the step of:
updating the contactability information associated with said mobile station when said mobile station moves from one location area (LA) to another location area.

19. The method of claim 1, wherein the mobile station comprises a mobile telephone.

20. The method of claim 1, wherein said subscriber identities are international mobile subscriber identities (IMSI) in a GSM or UMTS system.

21. The method of claim 1, wherein said first subscriber identity of the at least two subscriber identities is used by a first core network ($CN_1$) and said second subscriber identity of the at least two subscriber identities is used by a second core network ($CN_2$), and wherein said method of claim 1 allows the mobile station to receive data connections from both $CN_1$ and $CN_2$.

22. A telecommunication system for establishing a signaling connection with a mobile station assigned at least two subscriber identities, comprising:
a radio network controller (RNC) having a radio access network (RAN); and
a paging database in communication with said RNC comprising subscriber identities and contactability information of active mobile stations in the RAN of said RNC, said active mobile stations including the mobile station assigned said at least two subscriber identities, wherein said paging database comprises said at least two subscriber identities of said mobile station;
wherein said RNC comprises:
means for establishing, if there is a present active connection under a first subscriber identity of said at least two subscriber identities with said mobile station, a new signaling connection under a second subscriber identity of the at least two subscriber identities with the mobile station using subscriber identity and contactability information in said paging database by only signaling a base transceiver station (BTS) having the present active connection under said first subscriber identity with said mobile station.

23. A mobile station in a mobile telecommunication system, said mobile station having at least two subscriber identities, comprising:

means for transmitting at least one of contactability information and the at least two subscriber identities to a radio network controller (RNC) in whose radio access network (RAN) the mobile station is presently located;

wherein a paging database in said RNC receives and stores the transmitted contactability information and at least two subscriber identities; and wherein, if said mobile station has an active data connection under a first subscriber identity of the at least two subscriber identities, the at least one of the at least two subscriber identities and contactability information stored in the paging database are used by said RNC to establish a new signaling connection under a second subscriber identity of the at least two subscriber identities with the mobile station by only signaling a base transceiver station (BTS) having the active data connection under said first subscriber identity with said mobile station.

24. The mobile station of claim 23, wherein at least one of the contactability information and the at least two subscriber identities are transmitted when the mobile station established a data connection under a first subscriber identity of the at least two subscriber identities.

25. A paging database in a radio network controller (RNC) of a telecommunication system, said paging database for assisting in the establishment of signaling connections with mobile stations, comprising:

means for receiving contactability information and at least two subscriber identities corresponding to a mobile station located in a radio access network (RAN) of the RNC;

means for storing said contactability information and a plurality of subscriber identities corresponding to the mobile station located in the RAN of the RNC; and means for retrieving said contactability information and the at least two subscriber identities corresponding to the mobile station when a call under a second subscriber identity of the at least two subscriber identities is received, said retrieval performed by searching for said second subscriber identity of the at least two subscriber identities;

wherein, if there is a present active connection under a first subscriber identity of said at least two subscriber identities with said mobile station, the RNC uses the retrieved contactability information and the at least two subscriber identities corresponding to the active mobile station to establish a new signaling connection with the mobile station for the received call under the second subscriber identity by only signaling a base transceiver station (BTS) having the present active connection under said first subscriber identity with the mobile station.

26. The paging database of claim 25, wherein the contactability information and the at least two subscriber identities are received when the mobile station established a data connection under a first subscriber identity of the at least two subscriber identities.

27. The paging database of claim 25, further comprising:

means for eliminating stored contactability information and the at least two subscriber identities corresponding to the mobile station when no data traffic is transmitted to or from the mobile station for a predetermined period of time.

28. A radio access network (RAN) for establishing a data connection with a mobile station in a traffic area of said RAN, wherein said mobile station has been assigned a first subscriber identity and a second subscriber identity, comprising:

a radio network controller (RNC) for receiving a paging request based on a received call to the second subscriber identity, and for retrieving a record corresponding to the second subscriber identity from a paging database, wherein said record comprises the first and second subscriber identities and contactability information of the mobile station, and wherein said record was previously created when the mobile station transmitted the first and second subscriber identities to the RNC;

wherein, if there is an existing data connection under the first subscriber identity with the mobile station, said RNC only signals a base transceiver station (BTS) with the existing data connection under the first subscriber identity with the mobile station and establishes a new data connection under the second subscriber identity with the mobile station for the received call, wherein said BTS is known from the retrieved record.

29. The RAN of claim 28, wherein said contactability information comprises at least one of information about a cell in which the mobile station is located, information about the signaling connections of the mobile station's existing data connections, and information about a primary paging channel monitored by the mobile station.

30. The RAN of claim 28, wherein the first subscriber identity is a first international mobile subscriber identity ($IMSI_1$) and the second subscriber identity is a second international mobile subscriber identity ($IMSI_2$) in a GSM or UMTS system.

31. A method for establishing a data connection in a mobile telecommunications system, comprising the steps of:

transmitting, by a mobile station having a first subscriber identity and a second subscriber identity, said first and second subscriber identities to a radio network controller (RNC) of a radio access network (RAN) in which said mobile station is located;

receiving, by a paging database located in the RNC, said first and second subscriber identities and storing a record comprising said first and second subscriber identities with contactability information about the mobile station;

receiving a call under the second subscriber identity; and searching, by the RNC, the paging database by the second subscriber identity, finding, and then retrieving said record;

wherein, if there is an existing data connection under the first subscriber identity with the mobile station, the RNC only signals a base transceiver station (BTS) having the existing data connection under the first subscriber identity with the mobile station in order to establish a new data connection under the second subscriber identity with the mobile station for the received call, wherein said BTS is known from the retrieved record.

32. The method of claim 31, wherein a first core network ($CN_1$) assigned the first subscriber identity to the mobile station and a second core network ($CN_2$) assigned the second subscriber identity to the mobile station.

33. The method of claim 31, wherein a mobile switching center (MSC) or a serving GPRS support node (SGSN) receives the call under the second subscriber identity, further comprising the step of:

sending, by the MSC or the SGSN, a paging request to the RNC.

34. The method of claim 31, wherein the step of transmitting the first and second subscriber identities is performed at least one of when establishing a data connection with the mobile station or when the mobile station first becomes active.

35. The method of claim 31, wherein the step of transmitting the first and second subscriber identities is performed when establishing a data connection under the first subscriber identity.

36. The method of claim 31, further comprising the step of:
if there is no existing data connection with the mobile station, beginning paging based on the contactability information in the retrieved record.

37. The method of claim 31, wherein said contactability information comprises at least one of information about a cell in which the mobile station is located, information about the signaling connections of the mobile station's existing data connections, and information about a primary paging channel monitored by the mobile station.

38. The method of claim 37, further comprising the step of:
if there is no existing data connection with the mobile station, checking the contactability information in the retrieved record to determine whether the mobile station is in a same location area as where it was when a previous data connection was terminated.

39. The method of claim 1, further comprising the step of:
updating said contactability information when contactability changes are detected.

40. The telecommunication system of claim 22, further comprising:
means for updating said contactability information in said paging database when contactability changes are detected.

41. The mobile station of claim 23, wherein said contactability information in said paging database is updated when contactability changes are detected.

42. The mobile station of claim 23, wherein the at least one of contactability information and the at least two subscriber identities are transmitted when the mobile station first enters the RAN of the RNC.

43. The mobile station of claim 23, wherein the at least one of contactability information and the at least two subscriber identities are transmitted when the mobile station first becomes active in the RAN of the RNC.

44. The mobile station of claim 23, wherein the at least one of contactability information and the at least two subscriber identities are transmitted when the RNC establishes a data connection with the mobile station.

45. The paging database of claim 25, further comprising:
means for updating said contactability information in said paging database when contactability changes are detected.

46. The paging database of claim 25, wherein said means for storing said contactability information and plural subscriber identities corresponding to active mobile station located in the RAN of the RNC retain contactability information and subscriber identities of mobile terminal which no longer have active connections.

47. The method of claim 31, wherein the contactability information concerns the ability of the mobile telecommunications system to contact the subscriber associated with said mobile station.

48. The method of claim 31, wherein the contactability information comprises at least location information about the mobile station.

49. The telecommunications system of claim 22, wherein the act of only signaling the BTS having the present active connection under said first subscriber identity is performed using said present active connection.

50. The mobile station of claim 23, wherein the act of only signaling the BTS having the active data connection under said first subscriber identity is performed using said active data connection.

51. The paging database of claim 25, wherein the act of only signaling the BTS having the present active connection under said first subscriber identity is performed using said present active connection.

52. The RAN of claim 28, wherein the act of only signaling the BTS with the existing data connection under the first subscriber identity is performed using said existing data connection.

53. The method of claim 31, wherein said only signaling the BTS having the existing data connection under the first subscriber identity is performed using the existing data connection.

54. The method of claim 6, wherein the mobile station with the present active connection under the first subscriber identity does not actively listen on a paging channel because any signaling required by a new call would use the same signaling connection as the present active connection.

55. The telecommunication system of claim 22, wherein there is a present active connection under said first subscriber identity with said mobile station, and wherein, if a new signaling connection under said second subscriber identity is being established, any initial signaling required with said mobile station by said new signaling connection would use the same signaling connection as the present active connection.

56. The telecommunication system of claim 55, wherein the mobile station with the present active connection under said first subscriber identity does not actively listen on a paging channel because any initial signaling required by a new signaling connection would use the same signaling connection as the present active connection.

57. The mobile station of claim 23, wherein the mobile station has an active data connection under said first subscriber identity, and wherein, if a new signaling connection under said second subscriber identity is being established, any initial signaling required with said mobile station by said new signaling connection would use the same signaling connection as the active data connection.

58. The mobile station of claim 57, wherein the mobile station does not actively listen on a paging channel because any initial signaling required by a new signaling connection would use the same signaling connection as the present active connection.

59. The paging database of claim 25, wherein there is a present active connection under said first subscriber identity with said mobile station, and wherein, if a call under said second subscriber identity is being established, any initial signaling required by said call would use the same signaling connection as the present active connection.

60. The paging database system of claim 59, wherein the mobile station with the present active connection under said first subscriber identity does not actively listen on a paging channel because any initial signaling required by a new signaling connection would use the same signaling connection as the present active connection.

61. The RAN of claim 28, wherein there is an existing data connection under said first subscriber identity with said mobile station, and wherein, if a new data connection under said second subscriber identity is being established, any initial signaling required by said new data connection would use the same signaling connection as the existing data connection.

62. The RAN of claim 61, wherein the mobile station with the existing data connection under said first subscriber identity does not actively listen on a paging channel because any signaling required by a new data connection would use the same signaling connection as the existing data connection.

63. The method of claim 31, wherein there is an existing data connection under said first subscriber identity with said mobile station, and wherein, if a new data connection under said second subscriber identity is being established, any initial signaling required by said new data connection would use the same signaling connection as the existing data connection.

64. The method of claim 63, wherein the mobile station with the existing data connection under said first subscriber identity does not actively listen on a paging channel because any signaling required by a new data connection would use the same signaling connection as the existing data connection.

65. The method of claim 5, wherein the present active connection under said first subscriber identity with said mobile station has ceased, further comprising the step of:

sending a paging message to said mobile station on at least one primary paging channel, wherein the at least one primary paging channel is specified in said contactability information, thereby allowing said mobile station to listen to only said at least one primary paging channel.

66. The telecommunication system of claim 22, wherein said contactability information comprises at least one specified paging channel for said mobile station, and wherein, if there is no active data connection with said mobile station, said RNC transmits a paging message on said at least one specified paging channel, thereby allowing said mobile station to listen to only said at least one specified paging channel for paging messages.

67. The mobile station of claim 23, wherein said contactability information comprises at least one specified paging channel for the mobile station, and wherein, if there is no active data connection with said mobile station, said RNC transmits a paging message on said at least one specified paging channel, thereby allowing said mobile station to listen to only said at least one specified paging channel for paging messages.

68. The paging database of claim 25, wherein said contactability information comprises at least one specified paging channel for the mobile station, and wherein, if there is no present active connection with said mobile station, said RNC transmits a paging message on said at least one specified paging channel, thereby allowing said mobile station to listen to only said at least one specified paging channel for paging messages.

69. The RAN of claim 28, wherein said contactability information comprises at least one specified paging channel for the mobile station, and wherein, if there is no existing data connection with said mobile station, said RNC transmits a paging message on said at least one specified paging channel, thereby allowing said mobile station to listen to only said at least one specified paging channel for paging messages.

70. The method of claim 31, wherein said contactability information comprises at least one specified paging channel for the mobile station, and wherein, if there is no existing data connection with said mobile station, said RNC transmits a paging message on said at least one specified paging channel, thereby allowing said mobile station to listen to only said at least one specified paging channel for paging messages.

* * * * *